US005420396A

United States Patent [19]
Itoh et al.

[11] Patent Number: 5,420,396
[45] Date of Patent: May 30, 1995

[54] HEATING APPARATUS WHICH INTERRUPTS ENERGIZATION IN OVERHEATED STATE

[75] Inventors: Toshiyuki Itoh, Oyama; Toshihiko Inuyama, Fujisawa; Takeji Gima, Inagi; Hiroshi Hashimoto, Tokyo; Hiromichi Yamanaka, Kawasaki; Masanori Ishizu, Tokyo, all of Japan

[73] Assignee: Canon Kabushiki Kaisha, Tokyo, Japan

[21] Appl. No.: 843,924

[22] Filed: Feb. 26, 1992

[30] Foreign Application Priority Data

Feb. 28, 1991 [JP] Japan ................................ 3-58283

[51] Int. Cl.⁶ ............................................. H05B 1/02
[52] U.S. Cl. ........................ 219/497; 219/508; 219/505; 219/481; 219/501; 361/57; 307/117
[58] Field of Search ............ 219/497, 492, 508, 509, 219/505, 501, 487, 481; 361/31, 57, 64; 307/117

[56] References Cited

U.S. PATENT DOCUMENTS 4,065,802 12/1977 Mizukawa et al. ................ 219/497
4,751,371 6/1988 Clinton .............................. 219/506
5,162,038 11/1992 Wilker .............................. 219/497
5,175,413 12/1992 Holling et al. .................... 219/519

FOREIGN PATENT DOCUMENTS 63-49911 3/1988 Japan.

Primary Examiner—Mark H. Paschall
Attorney, Agent, or Firm—Fitzpatrick, Cella, Harper & Scinto

[57] ABSTRACT

A heating apparatus comprising a heating member, energization element for energizing said heating member, a temperature detection member for detecting a temperature of said heating member, a first switching element for turning on/off energization by said energization means on the basis of the temperature detected by said temperature detection member, abnormal current detection element for detecting an abnormal current flowing through said heating member, a second switching element for turning off energization by said energization element, and energization stop member for operating said second switching element to turn off energization.

5 Claims, 8 Drawing Sheets

FIG. 6
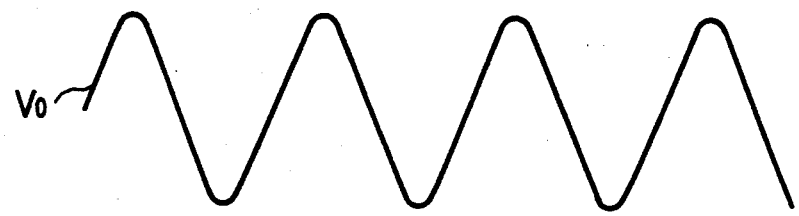
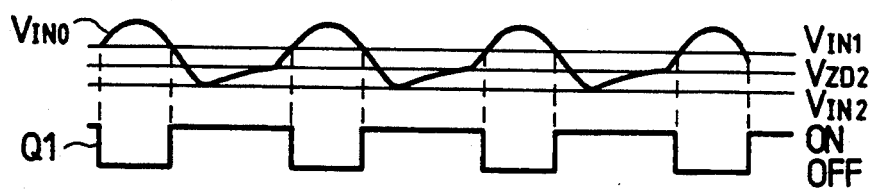
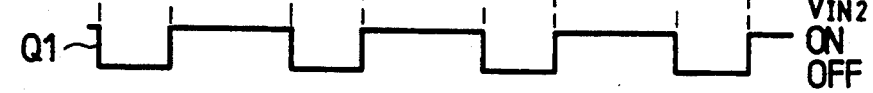
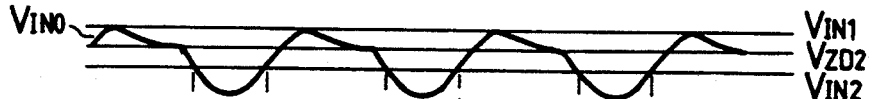
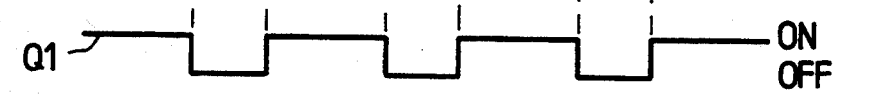
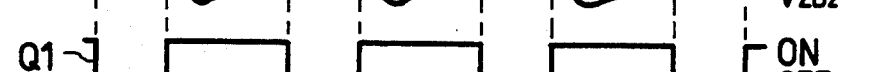
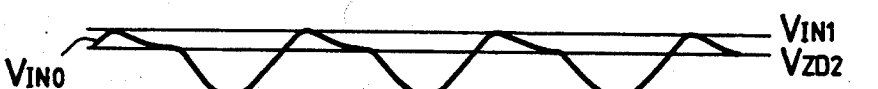
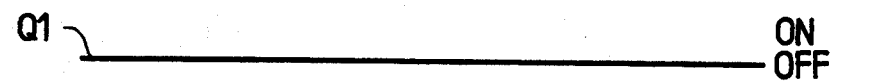

HEATING APPARATUS WHICH INTERRUPTS ENERGIZATION IN OVERHEATED STATE

BACKGROUND OF THE INVENTION (i) Field of the Invention

The present invention relates to a heating apparatus comprising a safety mechanism for interrupting energization to a heating member in an overheated state and, more particularly, to a heating apparatus suitably used as a fixing device for heating and fixing a non-fixed image on a recording medium.

(ii) Related Background Art

In a heating fixing apparatus, in order to prevent the apparatus from being damaged by an overrunning heater due to a defective temperature detection element or temperature control circuit, energization to the heater is interrupted in an overheated state. As a safety mechanism for interrupting energization to the heater in an overheated state, a temperature fuse or a thermoswitch is employed. As a countermeasure against the defective temperature fuse or thermoswitch, when an abnormal current flows through the heater, current supply to the heater is cut off.

FIG. 9 shows a circuit breaker of the heating apparatus described in Japanese Laid-Open Patent Application No. 63-49911. The circuit breaker comprises a breaking means 101 for breaking a current flowing through a heater 100, and a detection means 102 for detecting an abnormal current flowing through the heater 100 when the heater is inactive, and is controlled to break a current flowing through the heater 100 when the abnormal current is detected by the detection means 102. However, since the circuit for detecting an abnormal current, and breaking a current flowing through the heater is constituted by a large number of elements, even if one of the large number of elements malfunctions, the breaking means 101 cannot be operated in an abnormal state, and a large current is undesirably kept flowing through the heater 100.

SUMMARY OF THE INVENTION

It is an object of the present invention to provide a heating apparatus which can assure safety in an overheated state.

It is another object of the present invention to provide a heating apparatus which can switch a switching element for interrupting energization to a heating member by an energization means under a plurality of abnormal conditions.

It is still another object of the present invention to provide a heating apparatus comprising a heating member, an energization means for energizing the heating member, a temperature detection member for detecting a temperature of the heating member, a temperature control means for controlling energization to the heating member by the energization means, so that the temperature detected by the temperature detection means is maintained at a predetermined temperature, an abnormal current detection means for detecting an abnormal current flowing through the heating member, breaking means for, when the abnormal current detection means detects an abnormal current, interrupting energization by the energization means, an energization stop means for, when the temperature detection member detects an abnormal temperature higher than the predetermined temperature, operating the breaking means to interrupt energization.

It is still another object of the present invention to provide a heating apparatus comprising a heating member, an energization means for energizing the heating member, a temperature detection member for detecting a temperature of the heating member, a first switching element for turning on/off energization by the energization means on the basis of the temperature detected by the temperature detection member, an abnormal current detection means for detecting an abnormal current flowing through the heating member, a second switching element, arranged independently of the first switching element, for, when the abnormal current detection means detects an abnormal current, turning off energization by the energization means, and an energization stop means for, when the temperature detection member detects an abnormal temperature, operating the second switching element to turn off energization. Other objects of the present invention will become apparent from the following description.

BRIEF DESCRIPTION OF THE DRAWINGS

FIGS. 6(a) to 6(i) are timing charts for explaining some operations of the circuit shown in FIG. 1;

DETAILED DESCRIPTION OF THE PREFERRED EMBODIMENTS

An embodiment of the present invention will be described hereinafter.

Figure 10:
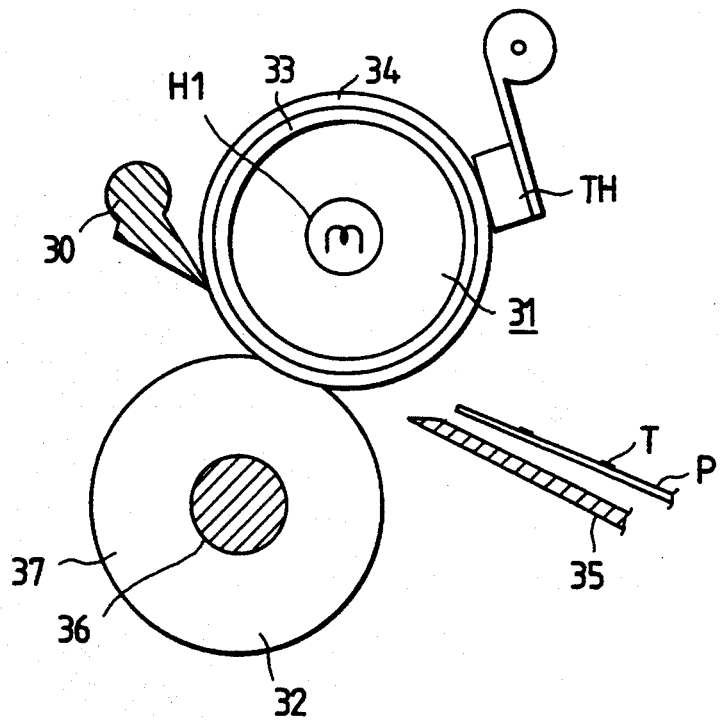
FIG. 10 is a sectional view of the heating apparatus according to the embodiment of the present invention.

FIG. 10 is a sectional view of a heating apparatus (fixing apparatus for fixing a toner image on a recording medium) according to an embodiment of the present invention. A heating roller 31 has a mold release layer 34 on a core metal 33. The heating roller includes a heater H1.

A thermistor TH detects the surface temperature of the heating roller. Energization to the heater H1 is controlled, so that a temperature detected by the thermistor is maintained at a predetermined fixing temperature.

A compression roller 32 forms a nip with the heating roller. The roller 32 comprises a rubber layer 37 of silicone rubber formed on a shaft 36. The fixing apparatus also has an entrance guide 35 and a peeling pawl 30.

A recording medium P, which supports a non-fixed toner image T, is fixed by a heat and a pressure at the nip when it is clamped and conveyed by the heating roller 31 and the compression roller 32.

Figure 1:
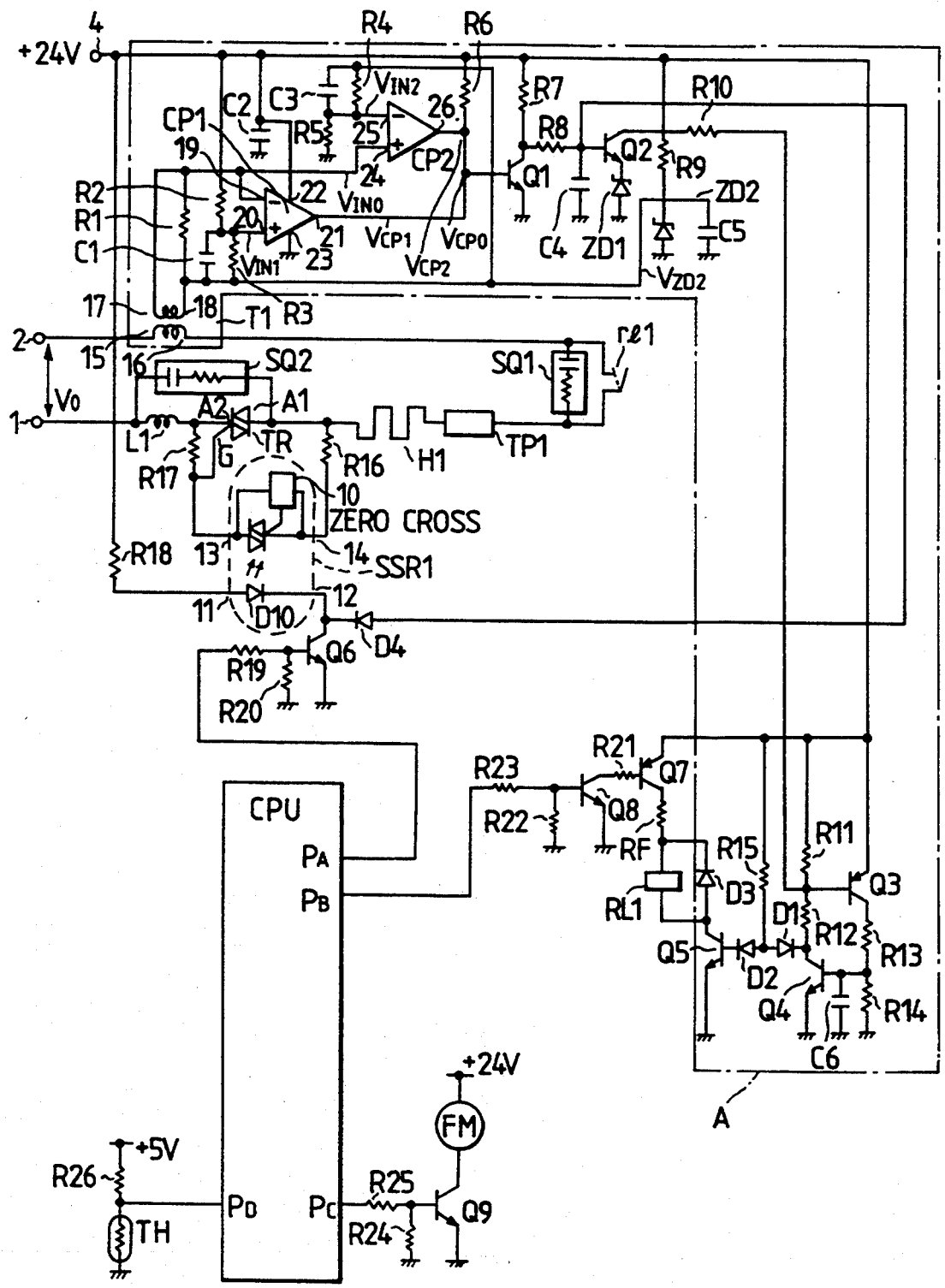
FIG. 1 is a circuit diagram of a heating apparatus according to an embodiment of the present invention.

FIG. 1 shows the circuit arrangement of this embodiment.

A terminal 2 is connected to the make terminal of a contact rl1 of a relay RL1 as a breaking means through primary terminals 15 and 16. The common 10 terminal of the contact rl1 is connected to the A1 terminal of a triac TR as a bidirectional thyristor for switching a heater H1 through a thermal protector TP1 and the heater H1 for the fixing apparatus. A spark killer SQ1 for preventing a spark upon opening/closing the contact rl1 is connected between the make and common terminals of the contact rl1.

A terminal 1 is connected to the A2 terminal of the triac TR through a coil L1. The terminal 1 is also connected to the A1 terminal of the triac TR through a spark killer SQ2. A resistor R17 is connected between the A2 terminal and the gate G of the triac TR. The gate G of the triac TR is connected to an output terminal 13 of a solid-state relay SSR1 incorporating a zero-crossing detector 10. The A1 terminal of the triac TR is connected to an output terminal 14 of the solid-state relay SSR1 through a resistor R16. A commercial AC power supply $V_0$ (not shown) is applied across the terminals 1 and 2.

In FIG. 1, an abnormal current detection means A detects an abnormal current flowing through the heater H1. The abnormal current detection means A has the following arrangement. That is, one secondary terminal 17 of a current transformer T1 is connected to an inverting input terminal 19 of a comparator CP1, and a non-inverting input terminal 24 of a comparator CP2, which comparators constitute the abnormal current detection means. A resistor R1 is connected between secondary terminals 17 and 18 of the current transformer T1. The other secondary terminal 18 of the transformer T1 is connected to a terminal 4 through resistors R3 and R2, and is also connected to a reference potential (to be referred to as "GND" hereinafter) through resistors R4 and R5. The node between the resistors R3 and R2 is connected to a non-inverting input terminal 20 of the comparator CP1, and the resistor R3 is connected in parallel with a capacitor C1. The node between the resistors R4 and R5 is connected to an inverting input terminal 25 of the comparator CP2, and the resistor R4 is connected in parallel with a capacitor C3. Furthermore, the secondary terminal 18 of the current transformer T1 is connected to the cathode of a Zener diode ZD2, and is also connected to +24 V through a resistor R9. The anode of the Zener diode ZD2 is connected to the GND, and the Zener diode ZD2 is connected in parallel with a capacitor C5.

An output terminal 21 of the comparator CP1 is connected to an output terminal 26 of the comparator CP2. The node between these terminals is connected to the base of an NPN transistor Q1, and is also connected to the terminal 4 through a resistor R6. A positive power supply input terminal 22 of the comparator CP1 is connected to +24 V, and a negative power supply input terminal 23 thereof is connected to the GND. A capacitor C2 is connected between the positive and negative power supply input terminals 22 and 23.

The emitter of the NPN transistor Q1 is connected to the GND. The collector of the transistor Q1 is connected to the terminal 4 through a resistor R7, and is also connected to the base of an NPN transistor Q2 through a resistor R8.

The base of the NPN transistor Q2 is connected to the GND through a capacitor C4, and is also connected to the anode of a diode D4. The emitter of the transistor Q2 is connected to the cathode of a Zener diode ZD1. The anode of the Zener diode ZD1 is connected to the GND. The collector of the NPN transistor Q2 is connected to the base of a PNP transistor Q3 through a resistor R10.

The emitter of the PNP transistor Q3 is connected to +24 V. The base of the transistor Q3 is connected to +24 V through a resistor R11, and is also connected to the cathode of a diode D1 and the collector of an NPN transistor Q4 through a resistor R12. The collector of the PNP transistor Q3 is connected to the GND through resistors R13 and R14. The node between the resistors R13 and R14 is connected to the GND through a capacitor C6. The emitter of the NPN transistor Q4 is connected to the GND.

The anode of the diode D1 is connected to +24 V through a resistor R15, and is also connected to the anode of a diode D2. The cathode of the diode D2 is connected to the base of an NPN transistor Q5. The emitter of the NPN transistor Q5 is connected to the GND. The collector of the NPN transistor Q5 is connected to the anode of a diode D3 and one coil of the relay RL1. The other coil of the relay RL1 is connected to the cathode of the diode D3, and the node therebetween is connected to the collector of a PNP transistor Q7 through a fuse resistor $R_F$ as a fuse element. The emitter of the PNP transistor Q7 is connected to +24 V, and the base thereof is connected to the collector of an NPN transistor Q8 through a resistor R21. The emitter of the NPN transistor Q8 is connected to the GND. The base of the NPN transistor Q8 is connected to the GND through a resistor R22, and is also connected to a $P_B$ port of a central control element CPU as a breaking control means through a resistor R23.

A $P_A$ port of the central control element CPU is connected to the base of an NPN transistor Q6 through a resistor R19. The base of the NPN transistor Q6 is further connected to the GND through a resistor R20, and the emitter thereof is connected to the GND. The collector of the NPN transistor Q6 is connected to the cathode of the diode D4, and is also connected to an input terminal 12 of the solid-state relay SSR1. An input terminal 11 of the solid-state relay SSR1 is connected to +24 V through a resistor R18.

A $P_C$ port of the central control element CPU is connected to the base of an NPN transistor Q9 through a resistor R25, and the base thereof is further connected to the GND through a resistor R24. The emitter of the NPN transistor Q9 is connected to the GND, and the collector thereof is connected to +24 V through a fan motor FM. A $P_D$ port of the central control element CPU is connected to +5 V through a resistor R26, and is also connected to the GND through a thermistor TH as a temperature detection means arranged near the heater.

The detection levels of the two comparators CP1 and CP2 will be described below with reference to FIG. 2 and FIGS. 3(a) to 3(d).

The reference voltages of the comparators CP1 and CP2 are respectively set at the positive (non-inverting) side and the negative (inverting) side, and reference voltage values $V_{IN1}$ and $V_{IN2}$ are respectively given by:

$$V_{IN1} = (R_3 \cdot V_0 + R_2 \cdot V_{ZD2})/(R_2 + R_3)$$

$$V_{IN2}=(R_5 \cdot V_{ZD2})/(R_4+R_5)$$

$V_{ZD2}$, $V_{IN1}$, and $V_{IN2}$ satisfy:

$$V_{IN2}<V_{ZD2}<V_{IN1}$$

The comparators CP1 and CP2 have open-collector outputs, and operate so that outputs $V_{CP1}$ and $V_{CP2}$ (if a comparison input (inverting side for CP1, non-inverting side for CP2) is represented by $V_{IN0}$) are open when the following relations are satisfied:

$$V_{IN0}<V_{IN1}, V_{IN2}<V_{IN0}$$

and, these outputs become 0 V when the following relations are satisfied:

$$V_{IN1}<V_{IN0}, V_{IN0}<V_{IN2}$$

Figure 2:
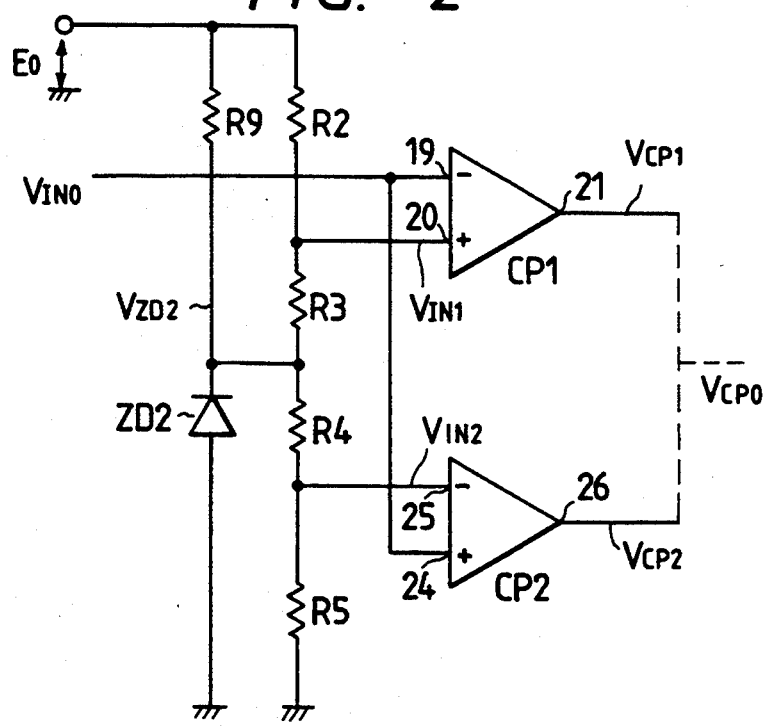
FIG. 2 is a circuit diagram for explaining a detection section of a comparator shown in FIG. 1.

When the output terminals 21 and 26 of the comparators CP1 and CP2 are connected as indicated by a dotted line in FIG. 2, a voltage $V_{CP0}$ at the node is open only when the following relation is satisfied:

$$V_{IN2}<V_{IN0}<V_{IN1}$$

Figure 3:
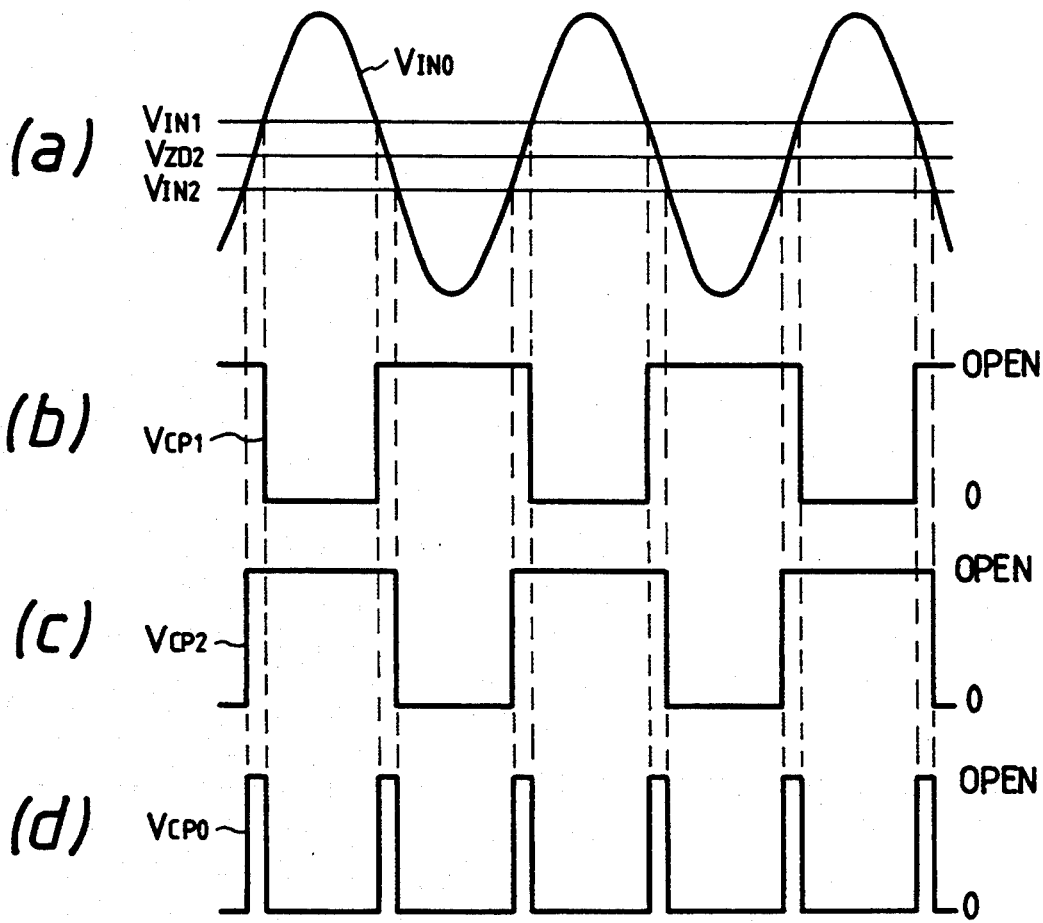
FIGS. 3(a) to 3(d) are timing charts for explaining the operation of the circuit shown in FIG. 2.
Figure 4:
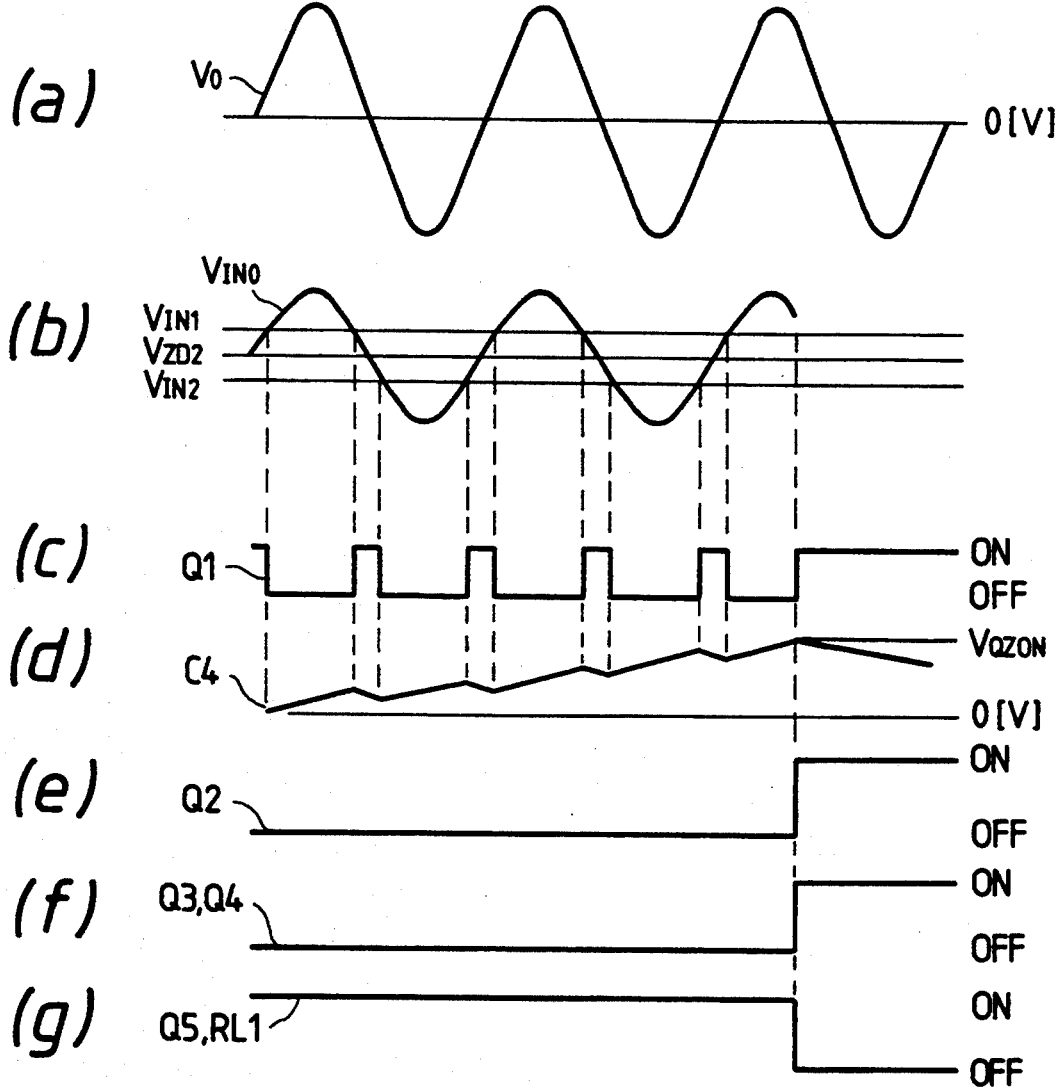
FIGS. 4(a) to 4(g) are timing charts for explaining some operations of the circuit shown in FIG. 1.
Figure 5:
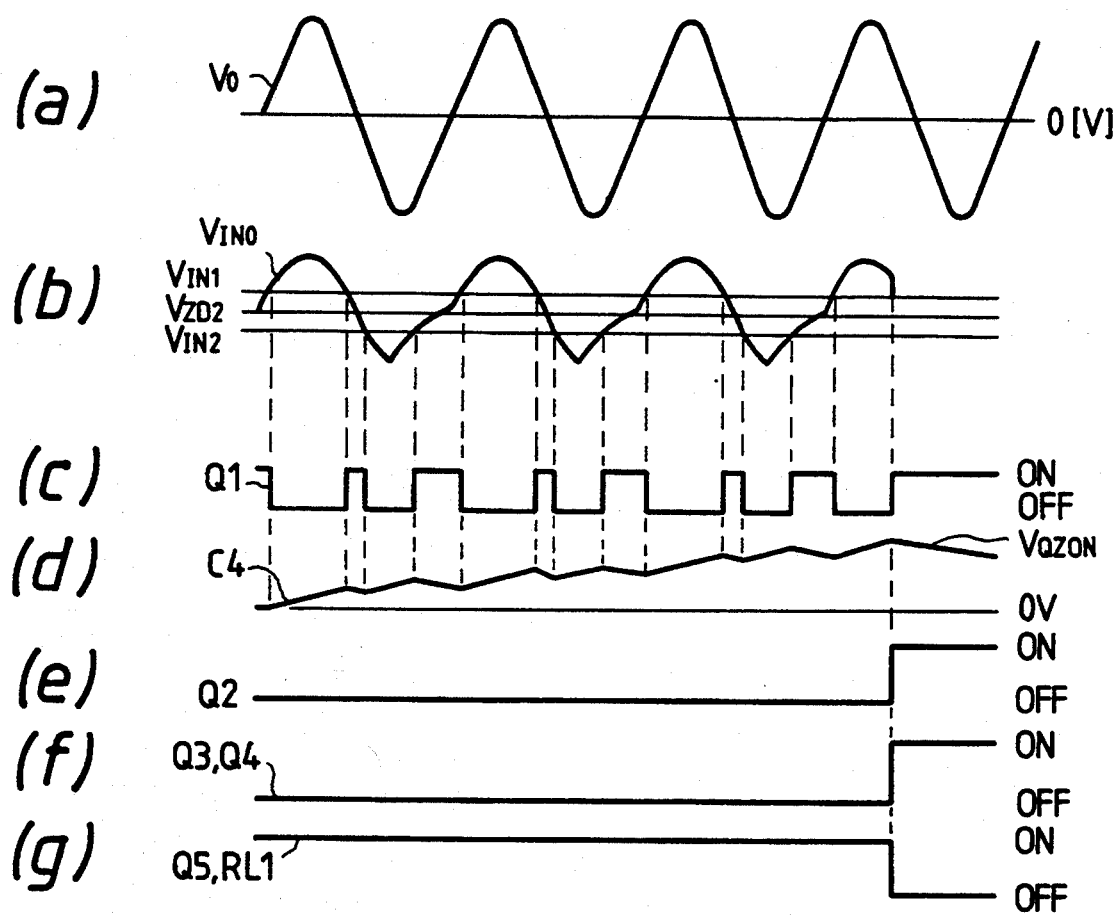
FIGS. 5(a) to 5(g) are timing charts for explaining some operations of the circuit shown in FIG. 1.

FIGS. 3(b), 3(c), and 3(d) respectively show the voltage waveforms of $V_{CP1}$ (sole), $V_{CP2}$ (sole), and $V_{CP0}$ when a sine wave shown in FIG. 3(a) is input to $V_{IN0}$.

The operation of the circuit shown in FIG. 1 will be described below.

When the power switch of the apparatus is turned on, since the surface temperature of the heating roller is lower than the fixing temperature, the central control element CPU sets the $P_b$ port at "H" level to enable the NPN transistor Q8 through the resistor R23, and to enable the PNP transistor Q7. At the same time, the central control element sets the $P_C$ port at "H" level to enable the NPN transistor Q9, thereby rotating the fan motor FM for cooling the interior of the apparatus.

In a normal state, when the temperature detected by the thermistor TH is higher than the fixing temperature, and the $P_A$ port of the central control element CPU is at "L" level, the transistor Q6 is disabled. For this reason, no current flows through a light-emitting diode D10 (connected between the input terminals 11 and 12) of the solid-state relay SSR1, and the solid-state relay SSR1 is disabled. Thus, no gate current flows through the triac TR, and the triac TR is disabled. As a result, even when the commercial AC power supply is applied across the terminals 1 and 2, no current flows through the primary side of the current transformer T1.

When no current flows through the primary side of the current transformer T1, no voltage is induced at the secondary side of the current transformer T1, and as described above, the voltage $V_{IN0}$ to the inverting input terminal 19 of the comparator CP1 and the non-inverting input terminal 24 of the comparator CP2 satisfies:

$$V_{IN2}<V_{IN0}=V_{ZD2}<V_{IN1}$$

In this case, since the outputs from both the comparators CP1 and CP2 are open, a base current flows through the NPN transistor Q1 through the resistor R6, and the NPN transistor Q1 is enabled. When the NPN transistor Q1 is enabled, since the base voltage of the NPN transistor Q2 has a value near 0 V, the NPN transistor Q2 is disabled. When the NPN transistor Q2 is disabled, since no base current flows through the PNP transistor Q3 and the NPN transistor Q4, the PNP transistor Q3 and the NPN transistor Q4 are disabled, and a base current flows through the NPN transistor Q5 through the resistor R15 and the diode D2, thereby enabling the NPN transistor Q5. When the NPN transistor Q5 is enabled, a current flows through the relay RL1. As described above, since the PNP transistor Q7 is enabled, the relay RL1 is enabled, and the make terminal of the contact rl1 of the relay RL1 is switched to a dotted line side in FIG. 1.

As described above, when the central control element CPU sets the $P_A$ port at "L" level, the triac TR is in an OFF state. For this reason, even when the contact rl1 of the relay RL1 is switched to the dotted line side, no current flows through the primary side of the current transformer T1, and the above-mentioned state continues.

When energization to the heater H1 is turned off during constant temperature control of the heating roller, and the temperature detected by the thermistor TH becomes lower than the fixing temperature, and when the central control element CPU sets the $P_A$ port at "H" level, a base current flows through the NPN transistor Q6 through the resistor R19, and the NPN transistor Q6 is enabled. When the NPN transistor Q6 is enabled, since the base of the NPN transistor Q2 is connected to the GND through the diode D4 and the collector and emitter of the NPN transistor Q6, the NPN transistor Q2 is disabled, and as described above, the PNP transistor Q3 and the NPN transistor Q4 are disabled. Then, the NPN transistor Q5 is enabled, and the relay RL1 maintains an ON state. On the other hand, when the NPN transistor Q6 is enabled, since a current flows through the light-emitting diode D10 of the solid-state relay SSR1 through the resistor R18, the solid-state relay SSR1 is enabled, and a gate current flows through the triac TR. The triac TR is enabled since the gate current flows. As a result, a main current loop of the terminal 2, the primary side of the current transformer T1, the contact rl1 of the relay RL1, the thermal protector TP1, the heater H1, the triac TR, the coil L1, and the terminal 1 is formed, and a current flows through the heater H1.

In this manner, when the $P_A$ port of the central control element CPU is switched between "L" and "H" levels according to the temperature detected by the thermistor TH, the surface temperature of the heating roller can be maintained at the predetermined fixing temperature.

The circuit operation of constant temperature control in a normal state has been described. An operation in an abnormal state will be described below with reference to the timing charts shown in FIGS. 4(a) to 5(g).

When a semiconductor such as a bidirectional thyristor is used in switching of a heater, the semiconductor often fails in a short mode.

FIGS. 4(a) to 4(g) are timing charts when the triac TR fails to cause a bidirectional conduction state, and FIGS. 5(a) to 5(g) are timing charts when the triac TR fails to cause a one-directional conduction state.

In a state wherein the central control element CPU sets the $P_A$ port at "L" level, when the triac TR fails to cause a bidirectional conduction state, $V_{IN0}$ as the inverting input terminal voltage of the comparator CP1 and the non-inverting input terminal voltage of the comparator CP2 becomes as shown in FIG. 4(b). As described above, only when the following relation is satisfied, the NPN transistor Q1 is enabled, and operates, as shown in FIG. 4(c):

$$V_{IN2} < V_{IN0} < V_{IN1}$$

On the other hand, since the NPN transistor Q6 is disabled, no current flows the collector-emitter path of the NPN transistor Q6 through the diode D4. Therefore, when the NPN transistor Q1 is disabled, the capacitor C4 is charged through the resistors R7 and R8; when the NPN transistor Q1 is enabled, the capacitor C4 is discharged through the resistor R8 and the NPN transistor Q1. FIG. 4(d) shows this state. As shown in FIG. 4(d), the voltage of the capacitor C4 is gradually increased due to the repetitive ON/OFF states of the NPN transistor Q1. When the voltage of the capacitor C4 reaches a voltage near a sum voltage (to be referred to as $V_{Q2ON}$ hereinafter) of the Zener voltage of the Zener diode ZD1 and the base-emitter voltage of the NPN transistor Q2, a base current flows through the NPN transistor Q2, and the NPN transistor Q2 is enabled.

When the NPN transistor Q2 is enabled, a base current flows through the PNP-transistor Q3 through the resistor R10 and the NPN transistor Q2, and the PNP transistor Q3 is enabled. When the PNP transistor Q3 is enabled, a base current flows through the NPN transistor Q4 through the PNP transistor Q3 and the resistor R13, and the NPN transistor Q4 is enabled. When the NPN transistor Q4 is enabled, since a base current flows through the PNP transistor Q3 through the resistor R12 and the NPN transistor Q4, a circuit constituted by the PNP transistor Q3 and the NPN transistor Q4 operates as a self holding circuit, and maintains an ON state even when the NPN transistor Q2 is disabled. On the other hand, when the NPN transistor Q4 is enabled, since the base current of the NPN transistor Q5 is broken, the NPN transistor Q5 is disabled, and the relay RL1 is disabled. As a result, the contact rl1 of the relay RL1 is opened to a solid line position shown in FIG. 1, and a current to the heater H1 is broken.

As shown in FIGS. 5(a) to 5(g), when the triac TR fails to cause a one-directional conduction state, substantially the same circuit operations as those in the bidirectional conduction breakdown are performed, except that a time required until the voltage of the capacitor C4 reaches $V_{Q2ON}$, i.e., a time required until the NPN transistor Q2 is enabled, becomes longer than that in the bidirectional conduction breakdown.

FIGS. 6(a) to 6(e) show variations of control waveforms when a one-directional conduction state occurs, and FIGS. 6(f) to 6(i) show output waveforms of the transistor Q1 when the comparator CP1 is solely used.

As described above, since the circuit constituted by the PNP transistor Q3 and the NPN transistor Q4 is the self holding circuit, no current flows through the primary side of the current transformer T1, and the following relation is satisfied:

$$V_{IN0} = V_{ZD2}$$

For this reason, even when the NPN transistor Q1 is enabled, and the NPN transistor Q2 is disabled, the circuit maintains the ON state.

The circuit operations until the relay RL1 is interrupted when the triac TR is short-circuited have been described. As described above, a large number of elements are operated from when the triac TR is short-circuited until the relay RL1 is interrupted. When one of the large number of elements malfunctions, the relay RL1 can no longer perform an interrupt operation.

For this reason, the apparatus of this embodiment comprises an energization stop means for, even when elements to be operated from when an abnormal current is detected until the relay RL1 is operated malfunction, operating the relay RL1 to open the contact rl1.

When the relay RL1 does not operate due to a malfunction of an element even when an abnormal current flows through the heater, since the current is kept flowed through the heater H1, a temperature near the heater H1 increases. When the temperature near the heater H1 is increased, a resistance $R_{TH}$ of the thermistor TH arranged near the heater H1 is decreased, and a voltage $V_{PD}$ input to the $P_D$ port of the central control element CPU is decreased. The voltage $V_{PD}$ input to the $P_D$ port of the central control element CPU is given by:

$$V_{PD} = (5 \times R_{TH})/(R26 + R_{TH}) \quad [V]$$

The temperature dependency of the resistance of the thermistor TH is generally given by:

$$R = R_0 e \times p\{B(1/T - 1/T_0)\}$$

$R_0$: resistance of thermistor at $T_0$ [K]
R: T [K]
B: thermistor constant

Therefore, the voltage $V_{PD}$ input to the $P_D$ port and the thermistor detection temperature have a one-to-one correspondence therebetween. When the temperature detected by the thermistor TH reaches a temperature $T_1$ [K] which causes damages to parts near the heater H1, the voltage $V_{PD}$ input to the $P_D$ port of the central control element CPU is then given by:

$$V_{PD1} = \frac{R_0 e \times p\{B(1/T_1 - 1/T_0)\}}{R26 + R_0 e \times p\{B(1/T_1 - 1/T_0)\}} \quad [V]$$

The central control element CPU sets the $P_B$ port at "L" level when the voltage $V_{PD}$ input to its $P_D$ port becomes equal to or lower than $V_{PD1}$, thereby disabling the NPN transistor Q8 and the PNP transistor Q7. Thus, the central control element CPU cuts off power supply to the relay RL1, i.e., disables the relay RL1. Furthermore, the central control element CPU sets its $P_C$ port at "L" level to disable the NPN transistor Q9. Thus, the central control element CPU cuts off power supply to the fan motor FM, and stops rotation of the fan motor FM.

As described above, the relay RL1, which disables the heater H1 when it is detected that an abnormal current flows through the heater H1, is interrupted when the thermistor TH detects that a temperature near the heater has reached a predetermined temperature $T_1$. Thus, even when a circuit for detecting an abnormal current malfunctions, the relay RL1 can be disabled, thus improving safety. Furthermore, when smoke or fire occurs inside the apparatus in an abnormal state, if the fan is rotated, fresh air is constantly supplied into the apparatus to maintain the smoke or fire. However, since the rotation of the fan motor FM is stopped in an abnormal state, fresh air is not supplied into the apparatus, and smoke or fire can be kept from being maintained or growing.

Figure 7:
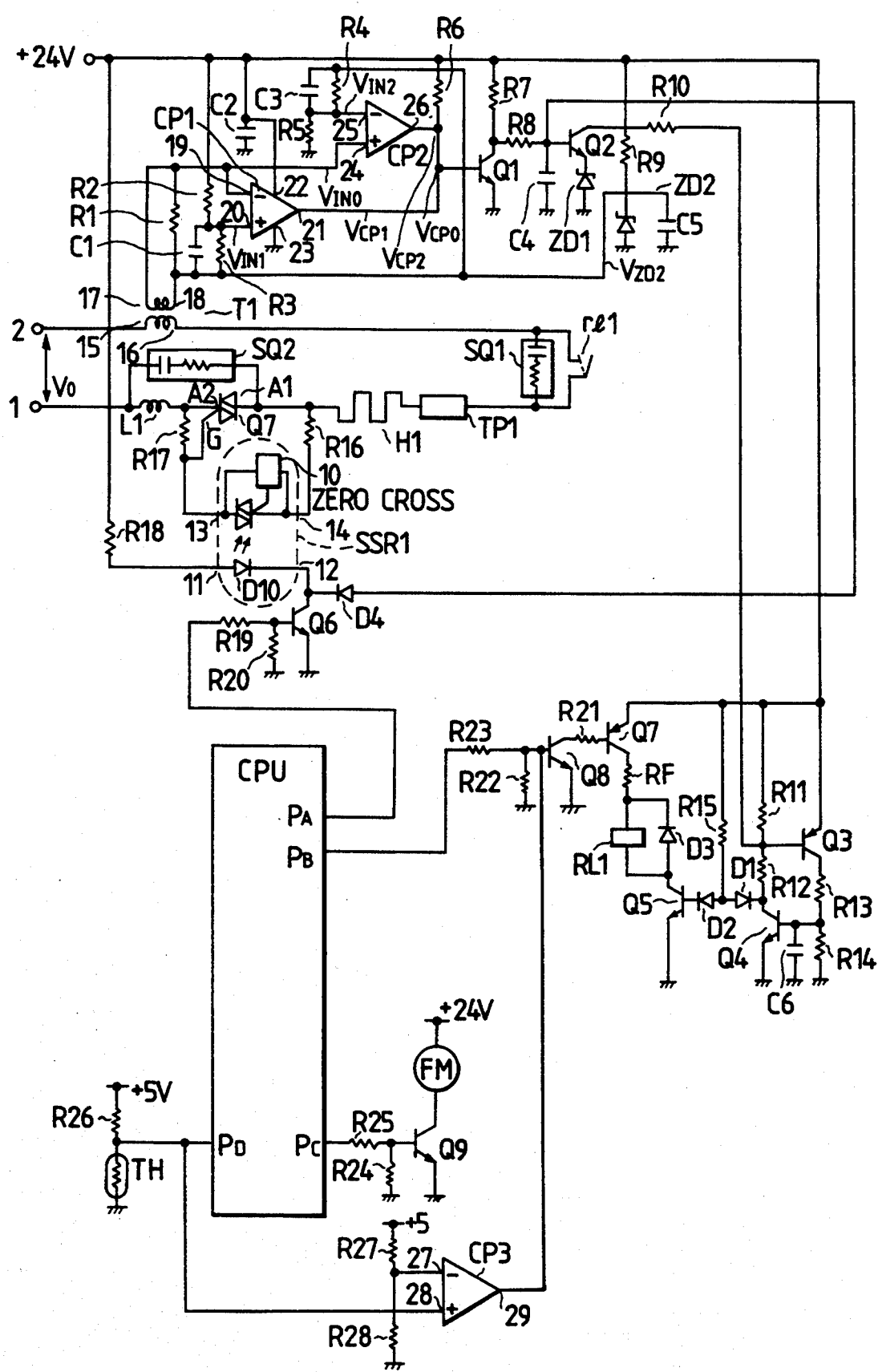
FIG. 7 is a circuit diagram showing a circuit breaker according to the second embodiment of the present invention.

FIG. 7 is a circuit diagram showing the second embodiment of the present invention.

In this embodiment, in addition to the first embodiment, even when an element CPU overruns, a relay RL1 can be operated by another circuit to open its contact rl1, and energization can be stopped.

In this embodiment, a comparator CP3, and resistors R27 and R28 are added to the first embodiment, and other arrangements are the same as those in the first embodiment.

As described in the first embodiment, when a temperature near a heater H1 is increased due to an abnormal current, and reaches $T_1$ [K], and when an input voltage to a $P_D$ port of a central control element CPU becomes equal to or lower than $V_{PD1}$, a $P_B$ port is set at "L" level to disable transistors Q8 and Q7, thereby cutting off power supply to the relay RL1, i.e., disabling the relay RL1. At the same time, since a voltage input to an input terminal 27 of a comparator CP3, which voltage is determined by resistive division of resistors R27 and R28, is set to be $V_{PD1}$, the output from the comparator CP3 goes to "L" level, and disables the transistors Q8 and Q7.

Even when the central control element CPU overruns, the relay RL1 can be disabled by another circuit, thus further improving safety.

Figure 8:
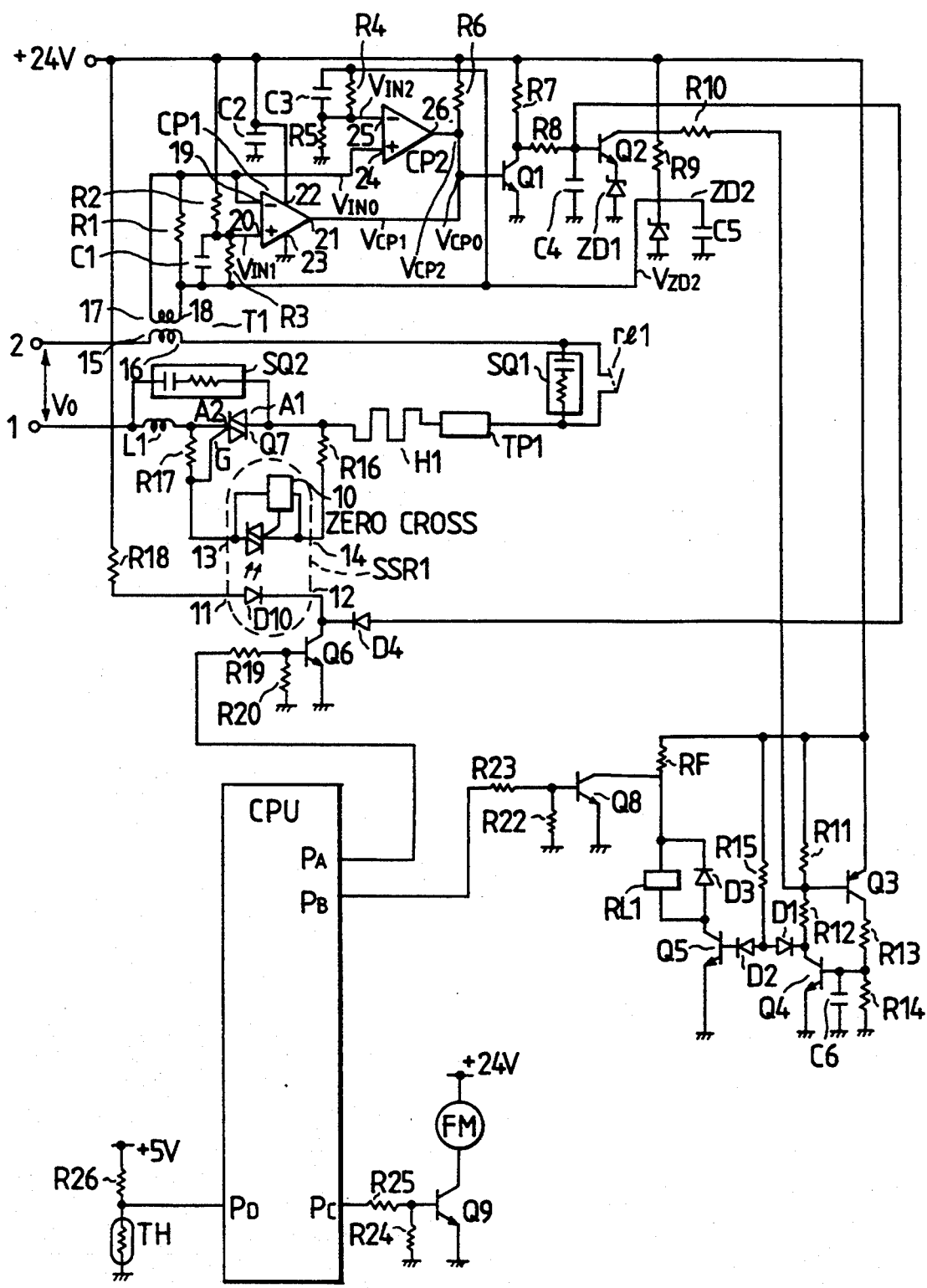
FIG. 8 is a circuit diagram showing a circuit breaker according to the third embodiment of the present invention.
Figure 9:
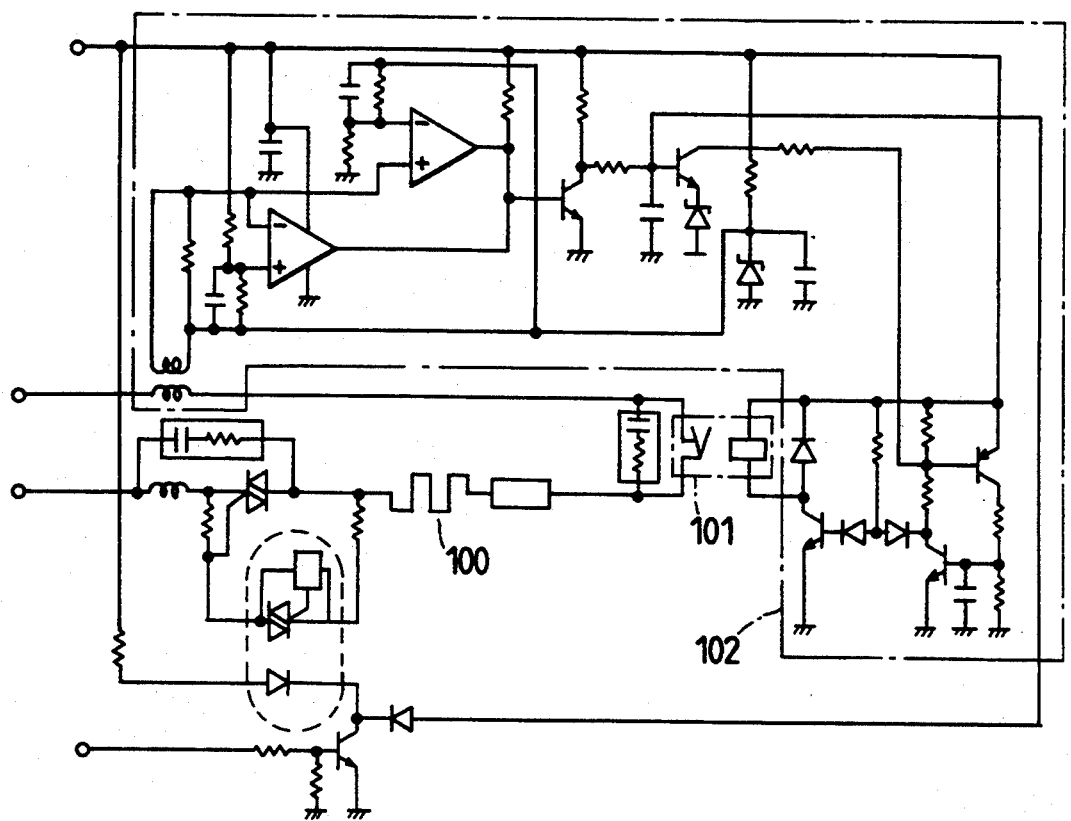
FIG. 9 is a circuit diagram showing a conventional circuit breaker.

FIG. 8 is a circuit diagram showing the third embodiment of the present invention.

In addition to the first embodiment, an apparatus of this embodiment comprises means for preventing recovery to an energization possible state when a relay RL1 opens its contact rl1 to interrupt energization.

The arrangement of this embodiment is substantially the same as that of the first embodiment, except that the collector of a transistor Q8 is connected to one terminal of a fuse resistor $R_F$ and a coil of a relay RL1, and the other terminal of the fuse resistor $R_F$ is connected to +24 V.

Like in the first embodiment, when an input voltage to a $P_D$ port of a central control element CPU becomes equal to or lower than $V_{PD1}$, the central control element CPU sets the $P_D$ port at "H" level to enable a transistor Q8, so that an overcurrent flows through the fuse resistor $R_F$ to disconnect the fuse resistor $R_F$ by melting. The central control element CPU functions as both a breaking control means, and an overcurrent application means.

As described in the first embodiment, when a temperature near the heater H1 reaches a dangerous temperature, the circuit or the apparatus is abnormal. For this reason, in this embodiment, by disconnecting the fuse resistor connected in series with the coil of the relay RL1 by melting so as to cut off power supply to the relay RL1, energization can never be recovered, thus further improving safety.

The embodiments of the present invention have been described. However, the present invention is not limited to these embodiments, and various changes and modifications may be made within the spirit and scope of the invention.

What is claimed is:

1. A heating apparatus comprising:
   a heating member heated by a heater;
   energization means for energizing said heater;
   a temperature detection member for detecting a temperature of said heating member;
   energization control means for controlling energization to said heater by said energization means so that the temperature detected by said temperature detection member is maintained at a predetermined heating temperature;
   a relay for intercepting energization to said heater;
   abnormal current detection means for detecting an abnormal current flowing through said heater;
   first relay control means for operating said relay so as to intercept energization to said heater when said abnormal current detection means detects the abnormal current flowing; and
   second relay control means for operating said relay so as to intercept energization to said heater when the detected temperature by said temperature detection member is greater than a predetermined abnormal temperature which is higher than the predetermined heating temperature.

2. An apparatus according to claim 1, wherein said energization control means comprises a bidirectional thyristor for controlling energization to said heater, and said first relay control means has a contact for opening/closing an energization path by said energization means.

3. An apparatus according to claim 1, wherein said heating apparatus is used in a fixing apparatus for fixing a non-fixed image on a recording medium, the non-fixed image on the recording medium being heated and fixed by heat from said heating member.

4. An apparatus according to claim 1, wherein said apparatus further comprises a fan, and fan stop means for stopping driving operation of said fan when said temperature detection member detects an abnormal temperature.

5. An apparatus according to claim 1, wherein said apparatus further comprises recovery preventing means for, when said energization stop means operates said breaking means to interrupt energization, preventing said breaking means from being recovered to an energization possible state.

* * * * *